Jan. 14, 1964    R. H. JOSEPHSON ETAL    3,118,074
SPRING TAKE-UP DEVICE
Filed May 3, 1960

INVENTORS
ROBERT H. JOSEPHSON
CHARLES B. SMALL
BY
Elbert J. Hyde
ATTORNEY 3,118,074
SPRING TAKE-UP DEVICE
Robert H. Josephson, Cleveland Heights, and Charles B. Small, Willoughby, Ohio, assignors to Clevite Corporation, Cleveland, Ohio, a corporation of Ohio
Filed May 3, 1960, Ser. No. 26,560
11 Claims. (Cl. 310—8.7)

This invention pertains to a take-up device to compensate for wide variations in manufacturing tolerances, and to take up slack induced in an assembled device due to wear of parts, changes in dimensions of parts due for example to permanent "set" of parts over a period of time.

Often when a device is assembled it is discovered, due to the allowance of reasonably wide manufacturing tolerances and unfortunate selection of parts, that the assembled device is not satisfactory. Tightening of the tolerance specifications is one answer, though a very expensive one. Another answer is selection of parts—this too is a costly procedure for large production items. Another solution is to provide an adjusting device which will take up the slack in the assembled parts. In the past this solution has been used during the manufacturing process, and generally has been successful. However, if the assembly is one which must maintain its adjustment over a long period of time, through periods of heating and cooling, and if the individual parts are subject to wear and to change of dimension (permanent set) over periods of time, the adjustment must be one the operator can perform, or the assembly will have to be repaired or replaced by a service man. While such a solution permits the manufacturer to get the device out of his plant at reasonable cost it is not a permanent solution.

This invention further pertains to a piezoelectric spark source and more particularly to a source of electric spark for firing an internal combustion engine or for igniting a furnace, clothes drier or the like, which piezoelectric device is subject to wear, permanent set and differential expansion and contraction of its parts due to thermal changes.

For details on how to apply such a spark source to an internal combustion engine reference may be made to the copending U.S. patent application Serial Number 776,793, filed November 28, 1958, for Spark Source, in the names of George H. Hufferd, Herman Lansing Vail, Jr., and Robert H. Josephson.

While piezoelectric single crystals of quartz, Rochelle salt and the like may be used as spark sources, their usefulness is somewhat limited in several respects compared to piezoelectric ceramic materials such as barium titanate, lead zirconate titanate and other known piezoelectric ceramics. Quartz is limited in its activity and Rochelle salt is quite limited in that it cannot operate over a period of time in a hot environment.

Piezoelectric ceramics can withstand the high compression forces necessary to generate 15-20,000 volts, sufficient to establish an exceedingly hot spark for ignition applications, such as for use in internal combustion engines and also for use in igniting furnaces, clothes driers or other devices wherein timed repetitive sparking is not required.

A disadvantage to the use of a ceramic material has been its tendency to shrink over a period of time, especially if it is used in a hot environment. Also, since the compression of the ceramic element causes it to shrink only a very minute amount, small variations in manufacturing tolerances become quite important in the voltage output of the device. Experience has shown that a suitably assembled device may operate satisfactorily for awhile, and then due to shrinkage of the ceramic element the mechanism for stressing the element becomes less effective, resulting in insufficient output voltage. When the assembled device takes into consideration expected shrinkage of the element the initial compression on the piezoelectric element is apt to be too high and actuation of the lever to stress the piezoelectric element becomes quite difficult, resulting in increased breakage of elements and also resulting in excess wear of parts.

A further disadvantage of prior devices was that wear in the lever system would loosen up the assembly and a given amount of lever motion would fail to produce sufficient voltage.

Consequently, due to the element changing in length, variations in manufacturing dimensions, loosening up of the device due to wear of key parts, etc., resulted in a subassembly which was quite unsatisfactory.

An object of this invention is to provide, in an assembled mechanism, a take-up device which biases the parts together in a manner such that wide manufacturing tolerances can be applied to the several parts, and which, over a long period of time, will continuously exert a bias and an automatic adjustment in one direction only, to take up slack between the parts induced due to wear, permanent set, and/or differential expansion of parts due to temperature changes.

An object of the present invention is to provide a piezoelectric ignition system having several parts which may be assembled and thereafter adjusted so that manufacturing tolerance of the several parts may be quite wide without adversely affecting the operation of the device.

Another object of the invention is to provide a piezoelectric ignition device which continuously automatically adjusts itself to expansion and contraction of the several parts, which automatically and continuously adjusts for unequal expansion and contraction of the several parts, and which automatically compensates for wear of the parts.

Still another object of the invention lies in the provision of a piezoelectric spark source whose voltage output remains about constant irrespective of small changes in dimensions of the piezoelectric element and the frame around it due to temperature changes, and irrespective of reasonable wear on the parts over a period of time.

Another object of the invention is to provide a piezoelectric ignition system wherein the piezoelectric element is preloaded and over a period of time maintains about the same amount of compressional force on the element.

For a better understanding of the present invention, together with other and further objects thereof, reference is had to the following description taken in connection with the accompanying drawings, and its scope will be pointed out in the appended claims.

With reference to the single sheet of drawing.

Figure 1:
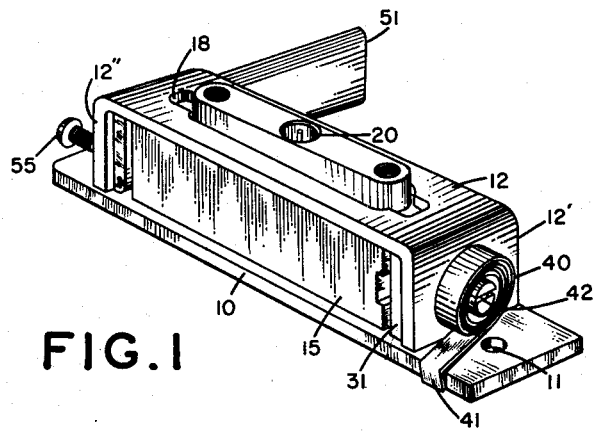
FIGURE 1 is an isometric view showing a piezoelectric ignition device in accordance with the invention, but with the end cap removed.

The device illustrated in the drawing is particularly adapted as a spark source for an internal combustion engine, wherein a rotating crankshaft, camshaft or other timed device, actuates a lever which compresses the piezoelectric element to establish an electric charge. This charge may immediately be applied to a spark plug, or it may be stored for a short period of time and then applied to a spark plug.

As shown in FIGURE 1 the unit comprises mounting means such as a base plate 10 having holes 11 through it to facilitate attachment to a device, and a frame or housing 12 secured to the base plate 10 in any suitable manner. Preferably both the base plate 10 and the frame or housing 12 are made of metal and are rigid to prevent substantial distortion due to action of the lever system which actuates the piezoelectric unit. Within the mounting means 10, 12 there is an insulating member 15 having a bore through it which contains a piezoelectric element 16, and having a portion 15' extending through a hole 18 in the frame 12. The portion 15' may have a plurality of threaded holes 19 to facilitate connecting it to portions of the electric circuit (not shown), and it has a bore 20 into which an electric lead 21 extends.

Figure 2:
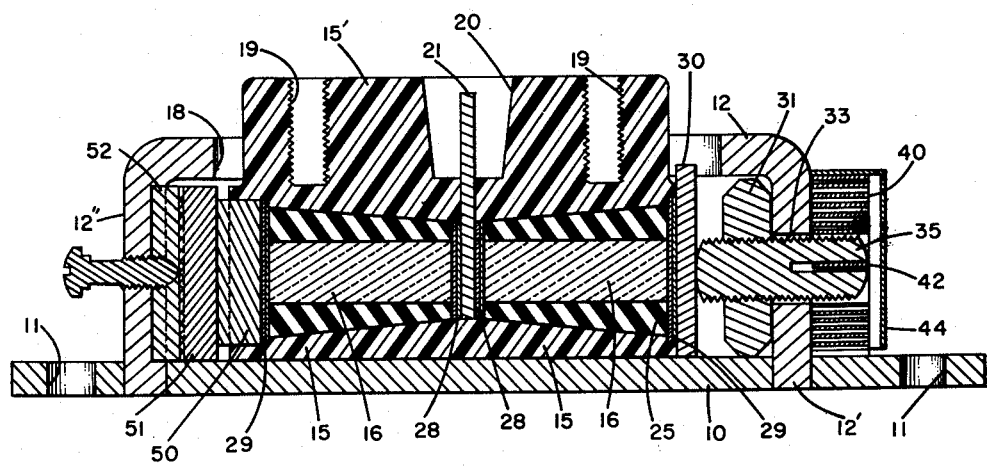
FIGURE 2 is a longitudinal sectional view of the device shown in FIGURE 1, but with the end cap in place.

Preferably the piezoelectric element is made of barium titanate, lead titanate zirconate or other such polycrystalline ceramic material, suitably polarized and electroded so that longitudinal compression will establish an electric charge across the end faces of the element. As shown in FIGURE 2 there may be two of the elements 16 mounted in the bore in the insulator member 15, and an additional insulating sleeve 25 is positioned between the piezoelectric elements 16 and the insulator housing 15. Each of the end faces of the two elements 16 is suitably electroded, and electrically conductive spacer discs 28 and 29 are in engagement, respectively, with the hot end and the grounded end of the elements 16. The spacer discs 28 are in close physical and electrical contact with the lead 21.

Figure 3:
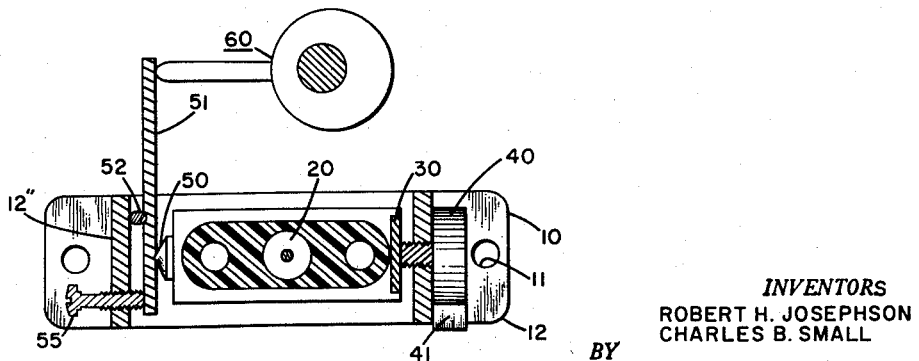
FIGURE 3 is a sectional view on a reduced scale, and schematically showing the device associated with an actuating device.

An end plate 30 is positioned against the spacer discs 29 at one of the electrically grounded ends of piezoelectric units 16, and is in electrical contact with the metal base plate 10. This end plate 30 may be cast into the insulator 15, as shown in FIGURE 3, for support. A threaded nut 31 is positioned between the end plate 30 and the downwardly turned end 12' and an adjusting screw 35 extends through hole 33, through the threaded nut 31, and into pressure engagement with the end plate 30. A coil spring 40, in tightly wound-up condition, has one of its ends 41 in engagement with the base 10 and has its other end 42 in the slot in the head of the adjusting screw 35, thereby to continuously apply a bias to the screw tending to tighten it toward the end plate 30. A cover 44 may be applied over the spring 40 and preferably is located in close proximity to the spring while the spring is in its pre-wound condition. As the spring unwinds due to its tightening action on screw 35 it engages the inside surface of the cover and thereafter the outer convolutions of the spring no longer expand. This causes the inner convolutions to unwind, and, in effect, gives the spring a much greater force throughout its unwinding action.

At the opposite end of the ceramic elements 16 there is lever pivot member 50 held in place by the molded insulator body 15 and in good physical and electrical contact with the spacer discs 29. A lever 51 extends into engagement with the pivot member 50. A hinge pin 52 is positioned between the lever 51 and the end wall 12" of the housing 12.

Before the ignition device is assembled in a motor, a holding screw 55 is threaded through the end wall 12" into engagement with the lever 51 to hold the lever in place; the screw 55, the pivot member 50 and the hinge pin 52 forming a three-point suspension for lever 51. After the spark source is installed in a motor, symbolized by the eccentric lever actuating mechanism 60, the screw 55 is removed. Thereafter the lever is held in place by pivot member 50, pivot pin 52 and the actuating mechanism 60.

Actuation of the spark source is due to action of the eccentric mechanism 60 against lever 51, and the lever pivots about the pivot pin 52 to compress both of the piezoelectric elements 16, 16, thereby establishing a high voltage charge which is discharged through the hot lead 21 at the proper time.

Without the adjusting screw 35 and the adjusting spring 40 manufacturing tolerances on the numerous parts must be held quite closely, otherwise a given amount of motion of the lever will not produce sufficient compression of the piezoelectric elements to establish an electric charge of desired magnitude. Also, temperature changes cause the steel housing to expand more than the ceramic piezoelectric elements. This is especially noticeable where the spark device is used in an internal combustion engine and is located in a hot environment.

Experience has shown that over a period of time ceramic piezoelectric elements, especially those operated in hot environments, tend to shrink in size. Thus, without the adjusting screw and adjusting spring of the present invention, even if the unit were perfectly manufactured, over a period of time its output would drop to an unsatisfactory value due to element shrinkage.

With the adjusting spring 40 and the adjusting screw 35 the manufacturing tolerances can be quite wide, thereby greatly reducing the manufacturing cost. After assembly the screw 35 is tightened against the end plate 30 putting an initial compression on both of the ceramic elements 16, and thereafter the spring 40 is wound tightly and then put in place. The spring 40 thereafter is always applying a tightening force on the screw 35. If the elements 16 shrink the spring 40 tightens the screw 35 to the extent that the initial compressive force is reestablished. Also, over a period of time wear takes place where the lever 51 engages the pivot member 50 and where it engages the pivot pin 52. The adjusting mechanism makes up for this wear, thereby greatly extending the life of the unit.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as wall within the true spirit and scope of the invention.

We claim:

1. A take-up device comprising, in combination, a base member, a separate member in assembled relation with said base member, screw thread means comprising a nut and a screw in force transmitting relation with both of said members and adapted upon relative turning between said nut and said screw to establish a given tension-compression relation between said two members, and stressed spring means in engagement with one of said members and in engagement with said screw for turning said screw in respect to said nut to establish and maintain substantially said given tension-compression relation between said two members, even though one member might expand and the other might contract, and in spite of variations in manufacturing tolerances.

2. A take-up device as set forth in claim 1, further characterized by a housing around said spring and closely positioned adjacent thereto to prevent the outer convolutions of said spring from greatly expanding.

3. A take-up device as set forth in claim 1, further characterized by said base member comprising a rigid frame around said separate member and having a hole through one end thereof, said screw extending through said hole and being in threaded engagement with said nut, said frame holding said nut against rotation, said spring means comprising a coil spring mounted around said screw thread means.

4. A take-up device as set forth in claim 3, further characterized by said screw being at one end of said frame and by actuating means positioned between the other end of said frame and said separate member, whereby said screw and said spring means always biases said separate member toward said actuating means.

5. A piezoelectric element device comprising in combination: a piezoelectric element adapted to be stressed to establish an electric charge, mounting means for mounting said piezoelectric element, a threaded nut held by said mounting means, a screw in threaded engagement with said nut and adapted upon tightening to stress said piezoelectric element to establish an initial compression therein, other stressing means cooperating with said mounting means for stressing said piezoelectric element in addition to said initial stress to establish said electric charge, and wound-up spring means connected to said mounting means and to said screw for continuously exerting a bias on said screw tending to tighten said screw to maintain said initial stress.

6. A piezoelectric element device as set forth in claim 5, further characterized by a housing around and confining said spring means.

7. A piezoelectric element device comprising in combination: a piezoelectric element adapted to be stressed to establish a charge therein, mounting means for mounting said piezoelectric element including threaded means, other stressing means cooperating with said mounting means for stressing said piezoelectric element, a screw in threaded engagement with said threaded means of said mounting means and adapted upon tightening to bias said piezoelectric element toward said other stressing means, and spring means one end of which is connected to said mounting means and the other end of which is in engagement with said screw for continuously exerting a bias on said screw tending to tighten said screw.

8. A take-up mechanism for a piezoelectric element, comprising, in combination: mounting means including a threaded nut mounting said piezoelectric element, lever means for stressing said piezoelectric element in accordance with a force applied to said lever means, screw thread means in threaded engagement with said nut and adapted upon tightening to bias said piezoelectric element toward said lever means, and spring means connected to said mounting means and in engagement with said screw thread means for continuously exerting a bias on said screw thread means tending to tighten said screw thread means.

9. A piezoelectric spark source device comprising in combination: a piezoelectric element having two ends and adapted to be compressed in a longitudinal direction between said two ends to establish an electric charge, a frame within which said element is mounted and including a threaded portion, said frame being spaced from each of said two ends of said element, lever means one end of which is mounted between said frame and a first end of said element for stressing said element in accordance with a force applied to another end of said lever means, screw thread means through the threaded portion of said frame and adapted upon tightening to bias said element toward said lever, and spring means one end of which is held by said frame and the other end of which is in engagement with said screw thread means for continuously exerting a tightening force on said screw thread means.

10. A piezoelectric spark source device comprising in combination: piezoelectric element means of the ceramic type adapted to be compressed in a longitudinal direction to establish an electric charge, said element means having a pair of end faces longitudinally spaced apart and side faces, insulating means surrounding said side faces, a frame including a threaded portion within which said element means and said insulating means are mounted, said frame having two end portions each spaced from one of the said pair of piezoelectric element end faces, lever means one end of which is mounted between one end portion of said frame and one of the ends of said piezoelectric element means for stressing said element means in accordance with a force applied to the other end of said lever means, a force distributing plate mounted against the other end of said piezoelectric element means, screw thread means threaded through the threaded portion of said frame and in force transmitting engagement against said distributing plate, and spring means one end of which is connected to said screw thread means always tending to tighten said screw thread means toward said piezoelectric element means and the other end of which is in engagement with said frame whereby the reactive force from said spring means is transmitted to said frame.

11. A piezoelectric spark source device comprising in combination: a longitudinally extending piezoelectric element having two ends and adapted to be compressed in a longitudinal direction between said ends to establish an electric charge, a housing including a threaded portion within which said element is mounted, said frame extending the length of said element and including end portions spaced from each of said two ends of said elements, lever means mounted with one of its ends between said housing and one end of said element for stressing said element in accordance with force applied to the other end of said lever means, screw thread means in threaded engagement with the threaded portion of said housing and mounted between said housing and the other end of said element and adapted upon tightening to bias said element toward said lever, and a coil spring coiled around a portion of said screw thread means and having one of its ends connected to the screw thread means and its other end in engagement with said housing, said coil spring being wound up and biasing said screw thread means against said piezoelectric element and toward said lever.

References Cited in the file of this patent

UNITED STATES PATENTS

| | | |
|---|---|---|
| 1,631,878 | Miller | June 7, 1927 |
| 1,962,057 | Clutterbuck | June 5, 1934 |
| 2,216,966 | Swift | Oct. 8, 1940 |
| 2,649,488 | Harkness | Aug. 18, 1953 |
| 2,954,506 | Harkness | Sept. 27, 1960 |
| 2,959,159 | McCrory et al. | Nov. 8, 1960 |

UNITED STATES PATENT OFFICE
CERTIFICATE OF CORRECTION

Patent No. 3,118,074 January 14, 1964

Robert H. Josephson et al.

It is hereby certified that error appears in the above numbered patent requiring correction and that the said Letters Patent should read as corrected below.

Column 4, line 45, strike out "establish and".

Signed and sealed this 8th day of September 1964.

(SEAL)
Attest:

ERNEST W. SWIDER
Attesting Officer

EDWARD J. BRENNER
Commissioner of Patents